(12) United States Patent
Xu

(10) Patent No.: US 8,787,577 B2
(45) Date of Patent: Jul. 22, 2014

(54) METHOD AND SYSTEM FOR WIRELESS TRANSMISSION OF CONTENT

(75) Inventor: Shuang Xu, Shenzhen (CN)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/552,541

(22) Filed: Jul. 18, 2012

(65) Prior Publication Data
US 2013/0251149 A1 Sep. 26, 2013

(30) Foreign Application Priority Data
Mar. 23, 2012 (CN) .......................... 2012 1 0080814

(51) Int. Cl.
*H04K 1/00* (2006.01)
(52) U.S. Cl.
USPC ............ 380/270; 380/255; 359/109; 359/195
(58) Field of Classification Search
None
See application file for complete search history.

(56) References Cited

U.S. PATENT DOCUMENTS

| 7,380,130 B2* | 5/2008 | England et al. ................ 713/189 |
| 2006/0088166 A1* | 4/2006 | Karusawa ...................... 380/277 |
| 2007/0233613 A1* | 10/2007 | Barrus et al. .................... 705/71 |
| 2007/0234215 A1* | 10/2007 | Graham et al. ............... 715/723 |
| 2009/0204494 A1* | 8/2009 | Weinblatt ........................ 705/14 |
| 2010/0001072 A1* | 1/2010 | Onogi ........................... 235/454 |
| 2010/0211506 A1* | 8/2010 | Chang et al. .................... 705/65 |

* cited by examiner

*Primary Examiner* — Philip Chea
*Assistant Examiner* — Khoi Le
(74) *Attorney, Agent, or Firm* — Zilka-Kotab, PC

(57) ABSTRACT

The invention discloses a method and a system for wireless transmission of content. The present invention relates generally to wireless network technology, Problems solved by the invention is that, the method for manually entering the shared key is neither convenient nor secure, while the method for transmitting the shared key over the wireless network also makes the shared key exposed to an unsafe environment. Embodiments of the invention provide the program as follows: a method and a system for wireless transmission of content, wherein, capturing shared key, using the shared key to encrypt the content, and then transmitting the encrypted content over the wireless network. Embodiments of the invention are suitable for terminals and devices wirelessly connected, and so on.

15 Claims, 4 Drawing Sheets

METHOD AND SYSTEM FOR WIRELESS TRANSMISSION OF CONTENT

PRIORITY AND RELATED APPLICATION DATA

The present application claims the priority of Chinese Patent Application No. 201210080814.1, filed on Mar. 23, 2012, which is incorporated herein by reference.

FIELD OF INVENTION

The present invention relates generally to wireless network technology, and in particular, to a method and a system for wireless transmission of content.

BACKGROUND

In modern life, there are increasing applications for wireless network. For example, display devices, such as projection devices, can be connected with computers, mobile phones and other terminals over the wireless network, so that videos, images and other contents in the terminals can be viewed on the display devices. While wireless work provides convenience, issues of the security between display devices and terminals need to be considered. Because wireless electromagnetic waves spread in all directions in the wireless transmission process, a third party may interrupt or intercept transmit content. Therefore, secure transmission methods need to be provided.

In prior art, a partnership between display devices and terminals can be established by negotiating a shared key. For example, random number, as a shared key, is displayed on the projection device, then users manually enter the shared key to a terminal, or the shared key is transmitted from the projection device to the terminal over the wireless network. Finally, the shared key is used to encrypt the transmission content, and the encrypted content is transmitted from the terminal to the projection device.

In the above-mentioned process, inventor found that the prior art has at least the following problems:

The method for manually entering the shared key is neither convenient nor secure, while the method for transmitting the shared key over the wireless network also makes the shared key exposed to an unsafe environment.

SUMMARY OF THE INVENTION

In order to solve the problems of the prior art, the present invention provides a method and a system for wireless transmission of content, so that the encryption key can be quickly and safely obtained, thus ensuring the security of transmission content.

To achieve the above-mentioned purpose, the embodiments of the invention provide the following solutions:

The embodiments of the invention provide a method for wireless transmission of content, comprises:

A method for wireless transmission of content, comprises: converting a shared key to image data; displaying the image data; capturing the displayed image data; converting the captured image data to the shared key: using the shared key to encrypt the content; transmitting the encrypted content over wireless network; and using the shared key to decrypt the content.

Preferably, wherein before the step of converting a shared key to image data, the method further comprises: generating random shared key.

Preferably, wherein users select displaying menu to execute the steps of generating random shared key, converting a shared key to image data and displaying the image data.

Preferably, wherein before the step of generating random shared key, the method further comprises: transmitting a display request over wireless network, wherein the display request contains identity information; according to the identity information, determining whether or not to accept the display request, if accepting, executing the step of generating random shared key, converting a shared key to image data and displaying the image data.

Preferably, wherein at the some time or after the step of transmitting a display request, the method further comprises; detecting the image data; when the image data is detected, executing the step of capturing the displayed image data.

Preferably, wherein the content is display content, and, after the step of using the shared key to decrypt the content, the method further comprises: displaying the decrypted content.

Preferably, wherein the image date is two-dimensional code.

Preferably, wherein a built-in image-capturing unit of terminals captures the displayed image data.

Preferably, wherein display device for displaying the image data is a projector or a LCD.

Preferably, wherein the shared key comprises public key and private key; the step of converting a shared key to image data is converting the public key to image data; the step of converting the captured image data to the shared key is converting the captured image data to the public key; the step of using the shared key to encrypt the content is using the public key to encrypt the content; the step of using the shared key to decrypt the content is using the private key to decrypt the content.

A system for wireless transmission of content, comprises wireless work, content source and display system, wherein the display system further comprises: a first key processing unit, used for converting a shared key to image data; a receiving unit, used for receiving encrypted content from the content source; a decrypting unit, used for using the shared key to decrypt the content; and a displaying unit, used for displaying the image data; and the content source further comprises: a image capturing unit, used for capturing the image data; a second key processing unit, used for converting the image data to the shared key; a encrypting unit, used for using the shared key to encrypt the content; and a transmitting unit, used for transmitting the encrypted content over the wireless network.

Preferably, wherein the display system further comprises: a key generating unit, used for generating random shared key.

Preferably, wherein the display system further comprises: a selecting unit, used for selecting displaying menu to enable the display system to execute the steps of generating random shared key, converting a shared key to image data and displaying the image data.

Preferably, wherein the transmitting unit, also used for transmitting display request over wireless network, wherein the display request contains the identity information; the receiving unit, also used for receiving the display request over the wireless network, wherein the display request contains the identity information; the determining unit, used for, according to the identity information, determining whether or not to accept the display request, if accepting, executing the step of generating random shared key, converting a shared key to image data and displaying the image data.

Preferably, wherein the content source further comprises: a detecting unit, used for detecting the image data, and when the image data is detected, enabling the capturing unit to capture the displayed image data.

Preferably, wherein the content is display content, and the displaying unit is also used for displaying the decrypted content.

Preferably, wherein the image date is two-dimensional code.

Preferably, wherein the display unit is a projector or a LCD.

Preferably, wherein the shared key comprises public key and private key; the first key processing unit, used for converting the public key to image data; the first key processing unit, used for converting the captured image data to the public key; the encrypting unit, used for using the public key to encrypt the content; the decrypting unit, used for using the private key to decrypt the content.

Preferably, wherein the encrypting unit and the decrypting unit use the RSA cryptosystem.

Embodiments of the inventions combines the way of capturing to obtain encryption key with wireless transmission of content encrypted by the encryption key, in order to, based on ensuring to rapidly and safely obtain the encryption key, improve the security of transmission content. Moreover, combined with the public key and the private key in the asymmetric algorithms, the transmission of the public key is also in a secret pipeline, in order to further improve the security of transmission content.

DETAILED DESCRIPTION

Reference will now be made in detail to the preferred embodiments of the present invention, examples of which are illustrated in the accompanying drawings. Those skilled in the art will realize that the following description is illustrative only and is not intended to be in any way limiting.

Figure 1:
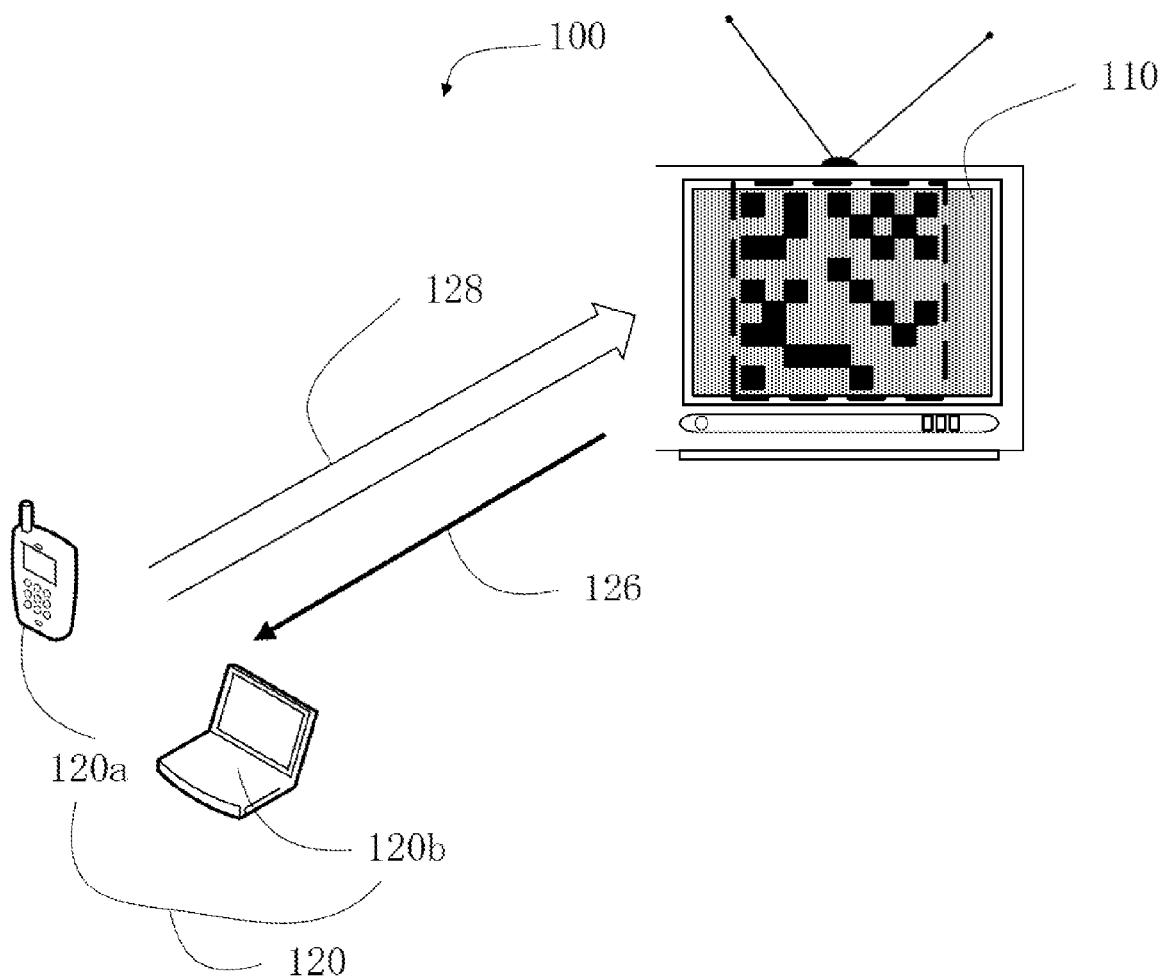
FIG. 1 illustrates a schematic diagram of a system for wireless transmission of content in accordance with an embodiment of the present invention.
Figure 2:
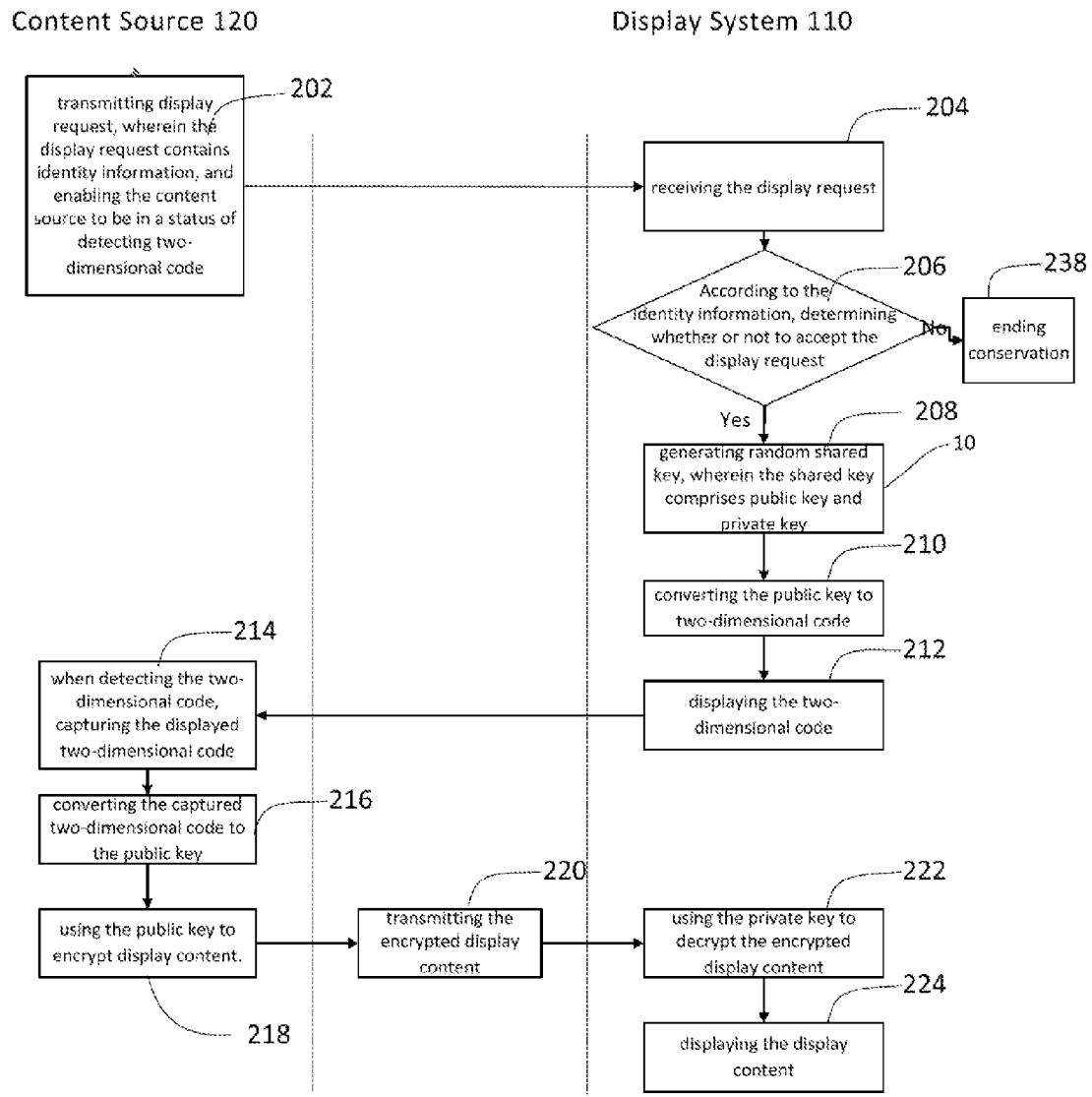
FIG. 2 illustrates a schematic flow diagram of a method for wireless transmission of content in accordance with an embodiment of the present invention.
Figure 3:
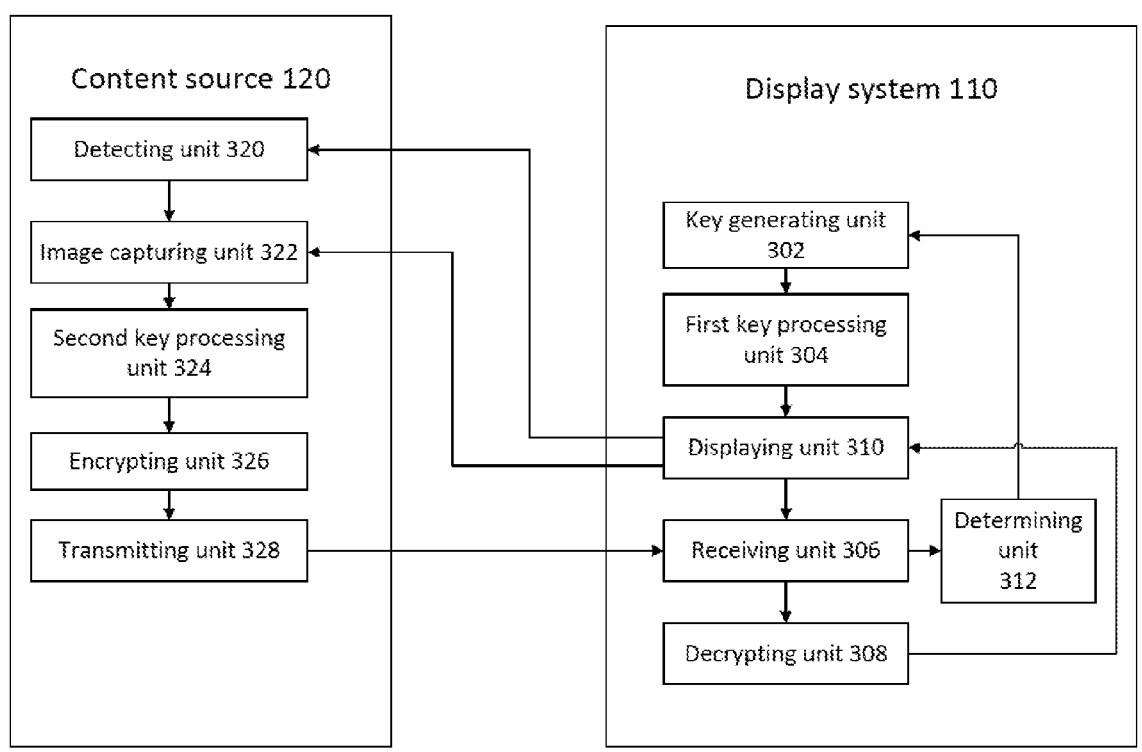
FIG. 3 illustrates a schematic structure diagram of a system for wireless transmission of content in accordance with an embodiment of the present invention.

Referring initially to FIG. 1, a system for wireless transmission of content is shown generally according to an embodiment of the present invention. The system comprises wireless network, a display system 110 and a content source 120. The display system 110 includes the image display device, wherein the display device may be any suitable type of device adapted to project or display a video or data image. Examples include, but are not limited to, liquid crystal display (LCD) and digital light processing (DLP) projectors.

FIG. 1 illustrates the transmission between the content source 120 and the display system 110. In the embodiments, the display system 110 may communicate with one or more content sources, and the content sources is terminals including a image capturing unit, such as mobile telephones 120a, laptops 120b, personal digital assistants (PDA), desktop computers, etc., wherein a camera device can be selected as the image capturing unit. The camera device may capture image data 126 which is displayed by the image display device in the display system 110, and the image data 126 is converted to a shared key between the content source 120 and the display system. And the shared key is used for encrypting the transmitting content 128. It should be appreciated that the image data 126 may be any displayable image, as long as it can be identified by the camera device on the content source side, including video images, still images, text, data images, etc. In the embodiments, the image data 126 may be two-dimensional codes, and the dimensional codes have characteristics of high information density, easy identification, so that it is suitable that the shared key is converted to the image data. The transmitting content may be in various forms, and in the embodiments, it may be displayable content. In addition, the camera device may be integrated to the terminals, or be provided as a separate component.

The following illustrates the method and the system according to the embodiments in details.

S202: on the content source side, transmitting display request, wherein the display request contains identity information, and enabling the content source to be in a status of detecting two-dimensional code.

S204: on the display system side, receiving the display request.

S206: on the display system side, according to the identity information, determining whether or not to accept the display request, wherein if the display request is accepted, execute S208, and if not accepted, then execute S238, that is, ending conversation.

In the S202-S206, the display device starts displaying the two-dimensional code by identifying the identity information. In other embodiments, the S202-206 may be skipped by selecting the function menu of the display device, such as on-screen display (OSD) menu, manually or by remote controllers, to enable the display device in a status of displaying the two-dimensional code. In addition, in the S202 and S214, using the detecting way automatically detects the presence of two-dimensional code; of course, when users see the two-dimensional code on the display device, he can use the camera device to manually capture the two-dimensional code.

S208, on the display system side, generating random shared key, wherein the shared key comprises public key and private key.

The way of generating the shared key may be the way which the display randomly generates, or be other ways.

In the embodiments, the shared key between the content source and the display system transmits by the capturing way, so that the way of transmitting the shared way is more secure. The shared key can use symmetric encryption algorism, such as AES, or asymmetric encryption algorism, such as RSA. Using the asymmetric encryption algorism may have extra benefits. Specially, the asymmetric key includes the public key and the private key, and what is transmitted by the wireless network between the content source and the display system are the transmission content, not including the key itself. Therefore, it may make the public key be secret, which changes the way of public broadcast. Under normal circumstances, if the public key is obtained by the third party, the possibility of cracking still exists, although it is difficult to deduce the private key or decrypt the content. While through the invention, the public key may be not obtained by the third party, so as to obviously improve the security of transmission content.

S210, on the display system side, converting the public key to two-dimensional code.

S212, on the display system side, displaying the two-dimensional code.

S214, on the content source side, when detecting the two-dimensional code, capturing the displayed two-dimensional code.

As mentioned above, using the detecting way automatically may detect the presence of two-dimensional code; of course, when users see the two-dimensional code on the display device, he may use the camera device to manually capture the two-dimensional code. The camera device may built in the terminals, such as mobile phones, laptops, or be provided as a separate component.

S216, on the content source side, converting the captured two-dimensional code to the public key.

S218, on the content source side, using the public key to encrypt display content.

The content transmitted may be in many forms, such as audio, video, images. In the embodiments, the content transmitted is display content.

S220, from the content source to the display system, transmitting the encrypted display content.

S222, on the display system side, using the private key to decrypt the encrypted display content.

S224, on the display system side, displaying the display content.

S238, ending conservation.

The embodiments also provides a system for wireless transmission of content, wherein the system comprises wireless work, content source 120 and display system 110, wherein the display system 110 further comprises:
  key generating unit 302, used for generating random shared key, wherein the shared key comprises the public key and the private key;
  first key processing unit 304, used for converting the public key to image data;
  receiving unit 306, used for receiving encrypted content, and also used for, over the wireless network, receiving display request, wherein the display request contains the identity information;
  decrypting unit, 308, used for using the private key to decrypt the encrypted display content; displaying unit 310, used for displaying the two-dimensional code and the decrypted display content; and determining unit 312, used for, according to the identity information, determining whether or not to accept the display request, if accepting, executing the step of generating random shared key, converting a shared key to image data and displaying the image data
  and the content source 120 further comprises:
  detecting unit 320, used for detecting the two-dimensional code;
  image capturing unit 322, used for capturing the displayed the two-dimensional code; second key processing unit 324, used for converting the two-dimensional code to the public key;
  encrypting unit 326, used for using the public key to encrypt the display content; and transmitting unit 328, used for transmitting the encrypted content over the wireless network and also used for transmitting the display request over wireless network, wherein the display request contains the identity information.

In the embodiments, as mentioned above, the display device starts displaying the two-dimensional code by identifying the identity information. Other embodiments may not use the detecting unit may, but use a selecting unit to select the menus on the display device, such as OSD menu, manually or by the remote controllers, no that the display device is in the status of displaying the two-dimensional code. Similarly, when viewing the presence of the two-dimensional code on the display device, users use the camera to manually capture the two-dimensional code. In addition, algorism of the encrypting unit 326 and the decrypting unit 308 can use RSA cryptosystem.

Figure 4:
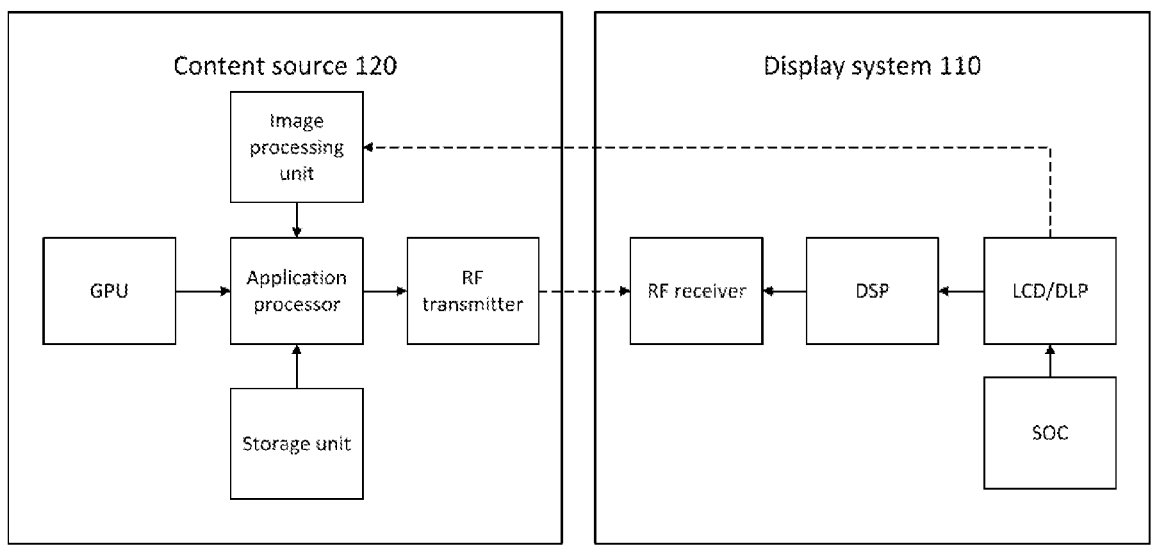
FIG. 4 illustrates a schematic structure diagram of a system for wireless transmission of content in accordance with an embodiment of the present invention.

As shown in FIG. 4, in another embodiment, the receiving unit 306 and the transmitting unit 328 are radio frequency (RE) receiver and radio frequency (RE) transmitter, used for transmitting encrypted content and perform conversation. On the display system 110 side, digital signal processor (DSP) may be used for decrypting the display content; while on the content source 120 side, if the terminal includes a GPU, the GPU may be used for encrypting the display content, wherein the content may be retrieved from storage unit. On the display system 110 side, system on-chip (SOC) may be used for generating random shared key and converting the key to the two-dimensional code. While on the content source 120 side, application processor (AP) may be used for converting the two-dimensional to the key.

It should be appreciated that, in the embodiments, the system for wireless transmission of content may refer to the method for wireless transmission of content, specifically not repeat them.

Embodiments of the inventions combines the way of capturing to obtain encryption key with wirelessly transmission of content encrypted by the encryption key, in order to, based on ensuring to rapidly and safely obtain the encryption key, improve the security of transmission content. Moreover, combined with the public key and the private key in the asymmetric algorithms, the transmission of the public key is also in a secret pipeline, in order to further improve the security of transmission content.

Embodiments of the invention are suitable for terminals and devices wirelessly connected, and so on.

The present invention has been described through the above-mentioned embodiments. However, it will be understand that the above-mentioned embodiments are for the purpose of demonstration and description and not for the purpose of limiting the present to the scope of the described embodiments. Moreover, those skilled in the art could appreciated that the present invention is not limited to the above mentioned embodiments and that various modifications and adaptations in accordance of the teaching of the present invention may be made within the scope and spirit of the present invention. The protection scope of the present invention is further defined by the following claims.

What is claimed is:

1. A method for wireless transmission of content, comprising:
  transmitting a display request over a wireless network, wherein the display request contains identity information;
  according to the identity information, determining to accept the display request;
  generating a shared key when it is determined to accept the display request, wherein the shared key comprises a public key and a private key;
  converting the public key to image data;
  displaying the image data;
  capturing the displayed image data;
  converting the captured image data to the public key;
  using the public key to encrypt content;
  transmitting the encrypted content over a wireless network; and
  using the private key to decrypt the content;
  wherein a user selects a displayed menu to execute the steps of generating the shared key, converting the shared key to the image data, and displaying the image data.

2. The method of claim 1, wherein the shared key is a random shared key.

3. The method of claim 1, wherein after transmitting the display request, the method further comprises:
   detecting the image data;
   when the image data is detected, executing the step of capturing the displayed image data.

4. The method of claim 1, wherein the content is display content, after the step of using the shared key to decrypt the content, and the method further comprises:
   displaying the decrypted content.

5. The method of claim 1, wherein the image data is two-dimensional code.

6. The method of claim 1, wherein a built-in image-capturing unit of a terminal captures the displayed image data.

7. The method of claim 1, wherein a display device for displaying the image data is a projector or a LCD.

8. A system for wireless transmission of content, comprising:
   a display system including:
      a first key processing unit for converting a shared key, the shared key comprising a public key and a private key, to image data by converting the public key to the image data;
      a receiving unit for receiving encrypted content from a content source, and for receiving a display request over a wireless network, wherein the received display request contains identity information;
      a determining unit for determining to accept the display request according the identity information;
      a decrypting unit for using the private key to decrypt the content; and
      a displaying unit, used for displaying the image data;
   a content source including:
      an image capturing unit for capturing the image data;
      a second key processing unit for converting the image data to the public key;
      an encrypting unit for using the public key to encrypt the content; and
      a transmitting unit for transmitting the encrypted content over the wireless network, and for transmitting the display request over the wireless network, wherein the display request contains the identity information;
   wherein the system is operable such that the shared key is generated when the display request is accepted;
   wherein the display system further includes a selecting unit for selecting a displayed menu to enable the display system to execute the steps of generating the shared key, converting the shared key to the image data, and displaying the image data.

9. The system of claim 8, wherein the display system further includes:
   a key generating unit for generating the shared key, wherein the shared key is a random shared key.

10. The system of claim 8, wherein the content source further includes:
   a detecting unit for detecting the image data, and when the image data is detected, enabling the image capturing unit to capture the image data.

11. The system of claim 8, wherein the content is display content, and the displaying unit is further for displaying the decrypted content.

12. The system of claim 8, wherein the image data is two-dimensional code.

13. The system of claim 8, wherein the displaying unit is a projector or a LCD.

14. The system of claim 8, wherein the encrypting unit and the decrypting unit use an RSA cryptosystem.

15. The method of claim 6, wherein the terminal that captures the displayed image data includes a graphics processing unit (GPU), and the GPU is used for encrypting the content.

* * * * *